INVENTOR
EMILIAN BOBKOWICZ

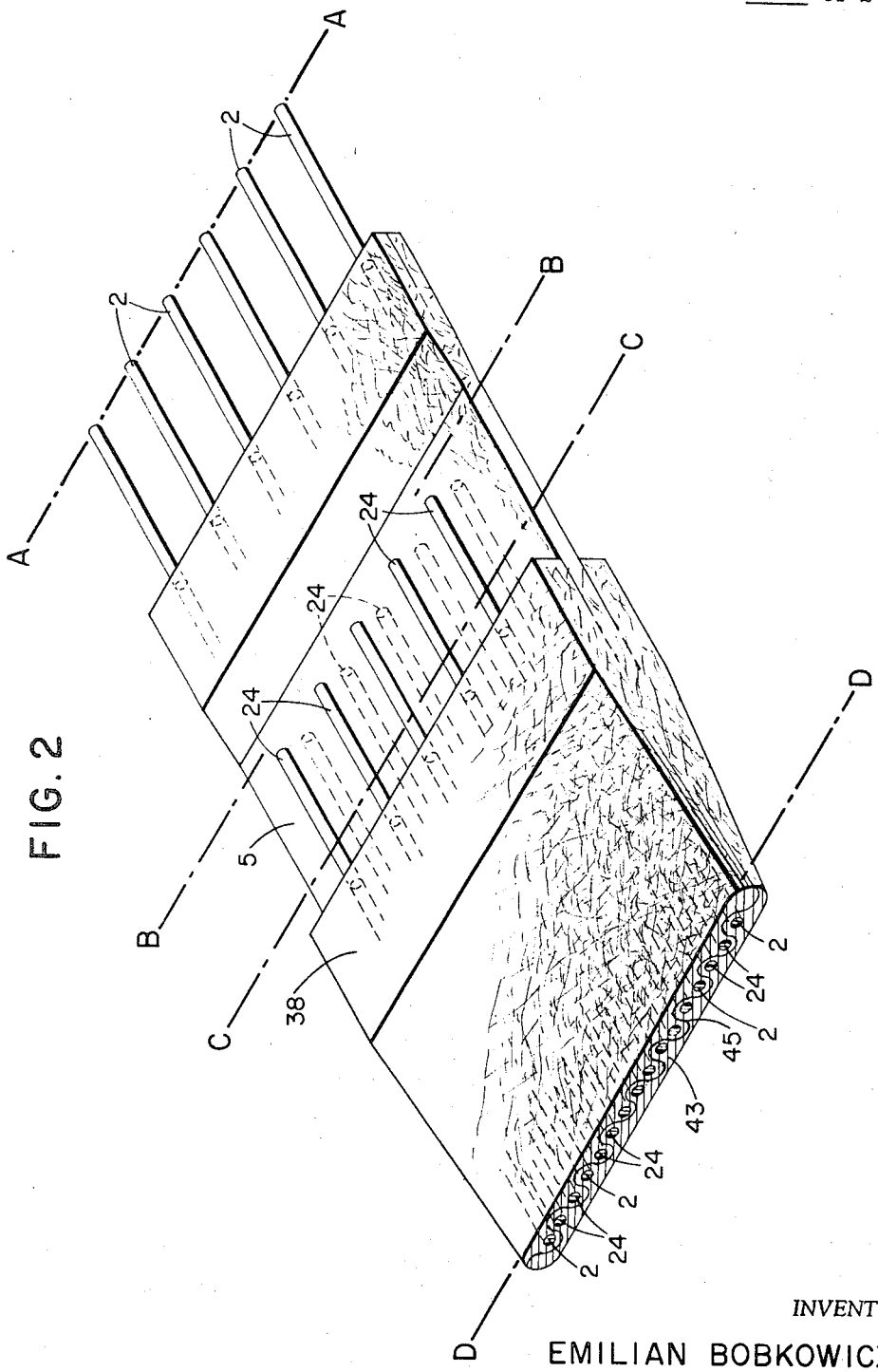

United States Patent Office 3,449,187
Patented June 10, 1969

3,449,187
METHOD AND APPARATUS FOR MAKING
NONWOVEN FABRICS
Emilian Bobkowicz, 1435 St. Alexander St., Room 310,
Montreal, Quebec, Canada
Filed Dec. 9, 1964, Ser. No. 416,984
Claims priority, application Canada, Dec. 8, 1964,
918,263
Int. Cl. B32b 23/18; B29f 3/10
U.S. Cl. 156—161      13 Claims

ABSTRACT OF THE DISCLOSURE

Nonwoven fabrics are produced according to the invention in a continuous sequence of operations by extruding from a suitable extruding device a curtain of thermoplastic resin filaments which are then stretched to cause orientation of the resin molecules; the curtain, still in tacky condition, is then contacted on at least one side thereof with a layer of evenly dispersed staple fibers and the filaments and staple fibers are pressed together and cooled to form an intermediate composite web; the latter is then warmed-up and contacted with additional extruded curtains of thermoplastic resin filaments which are oriented by stretching and superimposed with further layers of evenly dispersed fibers and the obtained combination is compressed and cooled to form the nonwoven fabric which can then be simply wound on a collecting roll at speeds exceeding 1000 feet per minute.

---

Figure 1:
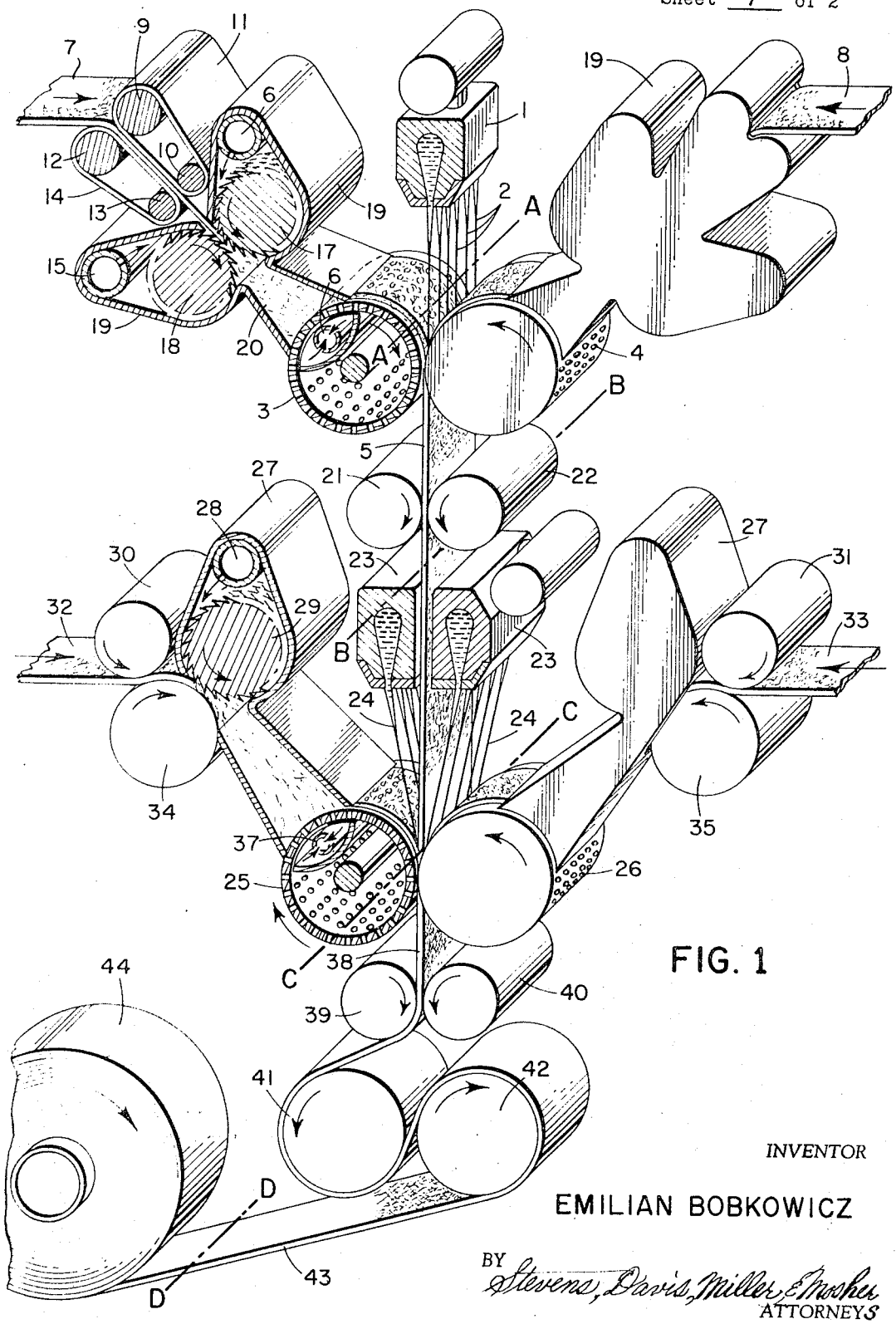

This invention relates to improvements in the manufacture of nonwoven fabrics.

More particularly, the invention relates to a novel method and apparatus for making in one continuous sequence of operations a new composite nonwoven fabric comprising a curtain of directly extruded and longitudinally oriented filaments interlocked and superimposed with staple fibers.

Nonwoven fabrics have hitherto been produced by the following basic fiber bonding methods.

(1) The wet processes in which the bonding agent is used in solvent or solution form and is applied to the fiberweb by saturation or spraying.

(2) The dry processes in which the bonding agent is in powder or staple fiber form.

(3) The mechanical methods in which the fibers in a fiberweb are mechanically interlocked, for instance by needle punching, or interlaced, for example by sewing, to form a nonwoven fabric.

The wet processes are complex and slow because they require proper application of the solvent and drying, before heat bonding can take place. They have the great disadvantage in that the fibers are thoroughly saturated with the bonding agent, which results, after heat bonding, in a change or loss of the basic desirable characteristics of the fibers and of the formed nonwoven fabric which thereby possesses an unpleasant paper-like appearance and hand.

The dry processes also have many drawbacks because the problem of an even application of the binder in powder form throughout and between the fibers, which is necessary to obtain a proper bond, is still considered unsolved and the hitherto obtained results are rather unsatisfactory.

The application of the binder in staple form is costly because of the high conversion costs of the resin into staple fibers, and proper even blending of the thermoplastic fibers with the base fibers of a nonwoven fabric is a complex operation requiring special blending equipment, before the composite fiber web can be formed and subjected to heat bonding without pressure.

The recently developed dry mechanical processes, such as needle punching and sewing interlacing of the fibers in a fiberweb, are relatively slow and require costly equipment. Their application is so far limited to a few end uses, such as producing fabrics for blankets, carpets and similar materials.

Applicant's Canadian Patent No. 670,012 of Sept. 10, 1963, discloses an improved method of making nonwoven fabrics by bonding together warp and weft yarns at their contact points. According to this patent prefabricated warp and weft yarns, made up of textile fibers which are held together by a heat activated bonding agent, are pressed together with application of heat and thereby form a textile web which has the appearance, strength, breeze and hand of a normal textile weave. Although this process is very suitable for certain uses and is more advantageous than similar hitherto known methods, it has an inconvenience in that prefabricated yarns must be utilized and that heat must be applied to bond the warp to the weft.

It has now been found that it is possible to overcome the above mentioned inconvenience and produce nonwoven fabrics in a cheaper, simpler and more rapid manner by using a warp of directly extruded oriented filaments and a weft of staple fibers, and laminating and consolidating this combination while the filaments are still tacky, thus eliminating the heating operation.

It is therefore a principal object of the present invention to provide a method and an apparatus for making nonwoven fabrics in a simple and efficient manner without using prefabricated warp and weft yarns.

It is a further object of this invention to provide an improved method of manufacturing nonwoven yarn fabrics by laminating and consolidating directly extruded and still tacky thermoplastic filaments with staple fibers without application of heat.

It is a still further object of the instant invention to form a new nonwoven fabric especially adapted to be used as an industrial weave material, but less costly than the hitherto known fabrics of the same type.

Other objects and advantages of the invention will be apparent from the following more detailed description.

In general terms, this invention is an improvement of the method for making nonwoven yarn fabric disclosed in applicant's Canadian Patent No. 670,012 in that, instead of prefabricated warp yarns, there are used thermoplastic longitudinally oriented filaments, properly spaced to form a continuous filament curtain. These filaments, right after their extrusion and their drawing for molecular orientation, and while still in tacky condition, are superimposed with evenly dispersed staple fibers of any desired type, which fibers act as a weft or filler. The obtained combination is subjected to compression and cooling and is thereby consolidated into a nonwoven fabric construction of strong warp filaments covered by and interlinked with the at random arranged staple fibers. This results in a web of an even nonwoven fabric in which the staple fibers are strongly bonded only at their many inner contact points to the thermoplastic filaments, without there being any loss of the desirable inherent properties of the fibers employed, such as appearance, hand, absorption, etc.

To assure a better interlocking of the staple fibers, two additional curtains of extruded, oriented filaments may be applied (one on each side of the fabric obtained as indicated above) on top of the two original layers of staple fibers and so that the additional filaments fall in between the first extruded filaments. In addition, another two layers of staple fibers can be superimposed upon said second and third filament curtains, while the latter are still tacky, and after subjecting the thus formed composite staple fiber-filament construction to compression and cooling, there is obtained a consolidated nonwoven fabric strongly bonded at all contact points, without any distortion of the outer and inner fibers in respect of their inherent desirable properties and appearance.

According to this invention, any extrudable thermoplastic resin can be used, but resins which will provide, after orientation of the molecules, satisfactorily strong filaments and proper bonding action are preferred. Such resins are for instance the polyamides (e.g. those known under the trademark "nylon 6") and the polyolefins (e.g. polypropylene). Staple fibers can be of any desired type of natural or man-made fibers, such as cotton, wool, bast fiber, rayon, etc. Each layer may consist of a different type of fiber if and when so desired.

The application of the staple fibers to the filament curtains can be achieved by any suitable method and means as, for example, by feeding a fiberlap into a lickerin device to break it up into separate fibers and carry the latter in an air current onto a revolving perforated drum which, through inside suction, forms on top thereof an even fiber web of desired thickness and density. This web is then brought by said drum into contact with the still tacky surface of the extruded and to a large degree oriented filament curtain and is pressed thereto with simultaneous cooling.

All this can be achieved on applicant's composite apparatus in one continuous sequence of operations from the filament extrusion using any suitable single or double die screw type extruder to consolidation of the fiber-filament layers into the final nonwoven fabric at speeds which may well exceed 1000 feet per minute. This apparatus further enables exact control of fiber web evenness, of fiber dispersion, web thickness as well as web density. It enables the use, as a binder, of substantially oriented resin filaments of any desired denier and permits to achieve strong bonding action without the necessity of heating the fiberwebs, which is unavoidable in all hitherto known dry or wet processes for manufacturing nonwoven fabrics and which often results in irreparable damage and distortion of the staple fibers.

By consolidating directly extruded and suitably oriented filaments between fiber layers, as set forth by the applicant, the cheapest and most convenient form of resin application is achieved, since a resin binder in pellet form is considerably cheaper and easier to apply than resin in fiber or any solvent or solution form.

The invention will now be described in more detail with reference to the accompanying drawings in which:

FIGURE 1 schematically illustrates the preferred embodiment of the process and apparatus according to the instant invention; and FIGURE 2 shows the products at section A—A, B—B, C—C and D—D of FIGURE 1.

In FIGURE 1, reference number 1 represents an extrusion die of any conventional extruder adapted to extrude a plurality of monofilaments 2 of a thermoplastic resin in linear arrangement with a desired space between each filament. This extrusion is done vertically downward to the nip of two positively driven drums 3 and 4 with perforated surfaces, each drum having therewithin a stationary air suction arrangement 6 to form continuously on the outer surfaces a substantially even layer of staple fibers randomly deposited onto said perforated drums with the aid of blowers 15 and 16. These blowers generate air currents adapted to blow the staple fibers from the teeth of the lickerin rolls 17 and 18 through a preferably venturi shaped channel 20 of a housing 19 onto the perforated surfaces of said drums 3 and 4.

The staple fibers may originally be in the form of fiberwebs 7 and 8, or in the form of any type of picker laps, cardwebs, garnet webs, drafter lap webs, slivers etc., which are supplied between two conveyar belts 11 and 14 driven by rolls 9, 10, 12, 13, into the teeth of the lickerin rolls 17 and 18 where the fiber material is broken down into individual fibers. These individual staple fibers are subsequently collected on said perforated revolving drums 3 and 4 and are brought, under pressure, into contact with the filaments 2 which at this point are still tacky. The whole is thus consolidated into a continuous nonwoven fabric 5 comprising a plurality of warp filaments positioned one beside the other so as to form a filament curtain and at random superimposed staple fibers strongly bonded together at contact points, preferably on both sides of said curtain. This composite fabric construction 5 may, if desired, be further consolidated between press rolls 21 and 22 before it is passed through a second double head extruder die 23 provided in its center with a slot head through which said fabric 5 is guided towards perforated drums 25 and 26 which are also provided with internal stationary suction arrangements 37.

Onto the surface of the drums 25 and 26 two additional randomly arranged staple fiber layers are deposited by the lickerin roll 29 supported by roll 34, with the aid of an air current from blower 28 through a venturi channel 36 in a housing 27. In this case the fiberwebs 32, 33, of any desired composition, are introduced between rolls 30, 34, 31, 35 and subjected to the lickerin action of the lickerin roll 29. Simultaneously, while fiberweb 5 is passing through the hot slotted extruder die 23, two filament curtains 24 are extruded on both sides of said fiberweb 5 preferably in such manner that each new filament 24 will be deposited in a staggered arrangement between the filaments 2 of the first filament curtain. Fiberweb 5, the thermoplastic filaments of which are slightly softened and made tacky again while passing through the second die 23, and second and third curtains of filaments 24 are brought into contact at the nip point of drums 25 and 26 together with the layers of staple fibers on the surfaces of said drums to form a sandwich like nonwoven fabric 38 comprising three inside staggered layers of filaments and two outer layers of randomly arranged staple fibers between which the staple fibers of the first fabric 5 are strongly interlocked and bonded at all contact points. This results in an all directional strong nonwoven filament-staple fiber porous fabric 43 which is finally consolidated between press rolls 39 and 40 and cooled by means of two cooling drums 41 and 42 before being wound up on a large commercial fabric roll 44.

It is an important feature of this invention to subject the filaments 2 and 24, right after their extrusion and before they are brought into contact with the respective staple fiberwebs, to a substantial drawing action to obtain an adequate longitudinal orientation of molecules in the filaments, for their greater strength and stability. This is achieved by providing much higher take up speeds of drums 3, 4 and 25, 26 than the filament extrusion speeds of extruder dies 1 and 23 respectively. Also a variation in the delivery speed of rolls 21, 22 and 39, 40 as well as in the take up speed of rolls 41, 42 can result in additional stretching and orientation of the finished product.

FIGURE 2, where the like components are designated by the same reference numerals as in FIGURE 1, illustrates the transformation of the initial filaments 2 (shown in section A—A) into the final product 43 (in section D—D) while passing by the first obtained nonwoven web 5 (in section B—B); section C—C shows the staggered position of filaments 24 with respect to filaments 2.

From this figure it becomes quite evident that the interlocking of staple fibers with filaments 2 and 24 in the nonwoven fabric 38 is indeed excellent since, when the filaments 24 are pressed into their final position between filaments 2, the randomly arranged fibers of the web 5 are depressed in opposite directions, as shown by the sinusoidal line 45, and the whole is covered and consolidated with additional layers of staple fibers to form a strongly bonded and at the same time suitably porous end product 43.

The so obtained nonwoven fabrics may find their use as industrial, household and to some extent in apparel weaves and more particularly in packaging (e.g. bags), and as backing (e.g. in linoleum carpets, rubber coated upholstery) etc.

Summarizing, the essence of the present invention resides in that a curtain of thermoplastic resin filaments is extruded, said filaments are stretched to cause proper orientation of the resin molecules and the curtain is contacted on at least one side thereof (preferably on both sides) with a layer of evenly dispersed staple fibers, while the filaments are still in tacky condition; the filaments and the staple fibers are then pressed together and cooled to form a composite web.

This composite web may then be contacted on one or both sides thereof with additional extruded curtains of thermoplastic resin filaments which are superimposed with further layers of evenly dispersed staple fibers and the whole is compressed and cooled in the similar manner as described above. The additional filaments are preferably so positioned that when the combination has been pressed, they fall in a staggered arrangement between the filaments of the first obtained composite web. This enables to produce a nonwoven fabric of improved strength and stability. If desired, this operation can be repeated several times until a product of suitable quality is obtained for the intended use.

The final product may also be further pressed and stretched in longitudinal direction for additional consolidation and orientation of the resin molecules.

The apparatus for performing the above mentioned operations is of the type illustrated in FIGURE 1. It should, however, be understood that many modifications evident to those skilled in the art can be incorporated into such an apparatus. For instance, the lickerin rolls can be of any suitable construction or can be entirely replaced by an equivalent device. It is also possible to eliminate these lickerin rolls entirely and directly apply staple fibers, if they are available in disintegrated form, onto the drums with perforated surface. The latter can also be modified or replaced by any appropriate device that will perform the function of applying an even layer of substantially parallel arranged staple fiberwebs to the curtain of filaments and compress them together. It is clear that many other similar changes may be made.

The formed nonwoven fabric is new and it has the main advantage over similar fabrics of being less costly in view of the facility, rapidity and cheapness of its manufacture.

What I claim is:

1. A method of making in a continuous sequence of operations nonwoven fabrics comprising: in a first step, extruding a curtain of thermoplastic resin filaments; stretching said filaments to cause orientation of the main molecules; contacting said curtain of filaments, on at least one side thereof, with a layer of staple fibers while the filaments are still in tacky condition; pressing the filaments and the staple fibers together and cooling to form an intermediate composite web of oriented thermoplastic filaments interlocked with staple fibers; then, in a second step, warming up said intermediate composite web to soften the thermoplastic resin filaments contained therein; extruding an additional curtain of thermoplastic resin filaments; stretching said filaments to cause orientation of the resin molecules; contacting said additional curtain of oriented filaments with the intermediate composite web on at least one side thereof and so that said filaments are positioned in a staggered arrangement between the softened filaments of said intermediate composite web; superimposing said additional curtain of filaments still in tacky condition with a layer of staple fibers; pressing the obtained combination and cooling to form a nonwoven fabric.

2. A method as claimed in claim 1, in which, in the first step, said curtain of filaments is contacted with the staple fibers on both sides thereof.

3. A method as claimed in claim 1, in which, in the second step, the intermediate composite web is additionally stretched in the longitudinal direction together with said additional curtain of thermoplastic resin filaments to effect further orientation of the resin molecules in the filaments of said intermediate composite web.

4. A method as claimed in claim 1, in which, in the second step, the additional curtain of thermoplastic resin filaments is contacted with the composite web on each side of the latter.

5. A method of making in a continuous sequence of operations and at speeds exceeding 1000 feet per minute a nonwoven fabric, comprising: in the first step, extruding a curtain of thermoplastic resin filaments; stretching said filaments to cause orientation of the resin molecules; contacting said curtain of filaments, on each side thereof, with a layer of evenly dispersed staple fibers while said filaments are still in tacky condition; pressing the filaments and the staple fibers together and cooling to form an intermediate composite web; and in the second step, passing said intermediate web in the middle of a double head extrusion die arrangement to soften the thermoplastic filaments therein; extruding from said die two additional curtains of thermoplastic resin filaments one on each side of the intermediate web; stretching said filaments to cause orientation of the resin molecules; contacting said additional curtains of filaments with the intermediate composite web so that said filaments are positioned in a staggered arrangement between the softened filaments of the intermediate web; superimposing each of said additional curtains of filaments still in tacky condition with a layer of evenly dispersed staple fibers; pressing the obtained combination to form a composite nonwoven construction; stretching said composite nonwoven construction in the longitudinal direction to effect further orientation of the resin molecules; cooling to form a nonwoven final product of oriented thermoplastic filaments interlocked and superimposed with at random arranged staple fibers, said product having good strength, stability and surface characteristics of the employed staple fibers, and winding said product on a collecting roll rotating at a speed exceeding 1000 feet per minute.

6. A method as claimed in claim 5, in which the obtained final product, prior to its winding on the collecting roll, is further treated as set forth in the second step of the operation to obtain a composite web of still greater strength and stability.

7. A method as claimed in claim 1, in which the thermoplastic resin is of the type selected from the group consisting of polyamide resins and polyolefin resins.

8. A method as claimed in claim 1, in which the staple fibers are formed by transforming fiberwebs into the individual fibers through the action of lickerin rolls.

9. A method as claimed in claim 5, in which a different type of staple fibers is used in each step of the operation.

10. Apparatus for making nonwoven fabrics in a continuous sequence of operations comprising in combination: an extruding device for extruding a curtain of thermoplastic resin filaments; means for stretching said filaments to cause orientation of the resin molecules; means for contacting and pressing said curtain of filaments with a layer of staple fibers; and means for cooling the obtained intermediate composite fabric; and further comprising; means for warming up the obtained intermediate composite fabric to soften the thermoplastic resin filaments therein; means for extruding an additional curtain of thermoplastic resin filaments; means for stretching said filaments of the additional curtain to cause orientation of the resin molecules; means for contacting said additional curtain of filaments with the intermediate composite fabric on at least one side of the latter and so that said filaments are positioned in a staggered arrangement between the softened filaments of said intermediate composite fabric; means for superimposing said additional curtain of filaments with a layer of staple fibers; means for pressing the obtained combination and means for cooling the resulting composite nonwoven fabric.

11. Apparatus as claimed in claim 10, further comprising lickerin means for transforming a fiberweb into a layer of staple fibers to be contacted and pressed with the curtain of filaments.

12. Apparatus as claimed in claim 10, in which the each means for stretching the filaments, each means for contacting and pressing the curtain with the layer of staple fibers and each means for cooling the obtained composite fabric consist of two positively driven drums with perforated surfaces; said drums being provided with driving means adapted to impart to said drums a higher speed than the filament extrusion speed; said drums being further provided therewithin with an air suction device mounted for depositing a layer of evenly disposed staple fibers onto the surfaces of said drums and to effect cooling of the formed composite fabric.

13. Apparatus for making nonwoven fabrics comprising in combination: an extrusion die for extruding a curtain of thermoplastic resin filaments; a pair of positively driven pressurizing drums positioned below said die adapted to impart to the latter a substantially higher speed than the filament extrusion speed, two fiberweb lickerin devices, one on each side of said die, adapted to break up a fiberweb into individual staple fibers and carry the latter onto the rotating drums with preforated surfaces; a stationary air suction device mounted within each of said drums for depositing on the perforated surface of the latter an even layer of the staple fibers; a double head extrusion arrangement positioned below said drums and adapted to extrude a curtain of thermoplastic resin filaments on each side of the composite web coming out from said drums, said double head extrusion arrangement being so mounted that said composite web can pass between the two heads thereof and be warmed up to soften the thermoplastic filaments therein; a second pair of positively driven pressurizing drums positioned below said double head extrusion arrangement and having perforated surfaces; driving means for said drums adapted to impart to the latter a substantially higher speed than the speed of filament extrusion from the double head extrusion arrangement; two additional fiberweb lickerin devices, one on each side of the double head extrusion arrangement, adapted to break up a fiberweb into individual staple fibers and to carry the latter onto the second pair of rotating drums with perforated surfaces; a stationary air suction device mounted within each of said second pair of drums for depositing on the perforated surface of the latter a layer of evenly dispersed staple fibers; a pair of positively driven pressure rolls positioned below said second pair of drums and adapted to receive therebetween the composite nonwoven fabric coming out of the second pair of drums; driving means for said pressure rolls adapted to impart to the latter a higher speed than that of said second pair of drums; a pair of cooling rolls positioned below said pressure rolls adapted to subject the resulting product to a cooling action; and a winding roll on which the final product is wound for commercial distribution.

References Cited

UNITED STATES PATENTS

| | | | |
|---|---|---|---|
| 2,901,770 | 9/1959 | Beck | 156—244 |
| 3,010,161 | 11/1961 | Duvall | 19—156 |
| 3,247,039 | 4/1966 | Schultheiss | 264—288 |
| 3,347,727 | 10/1967 | Bobkowicz et al. | 156—271 |

FOREIGN PATENTS 920,502   3/1963   Great Britain.

ROBERT F. BURNETT, *Primary Examiner.*

LINDA M. CARLIN, *Assistant Examiner.*

U.S. Cl. X.R.

156—167, 184, 178, 244, 436, 494, 500; 161—141, 142; 264—258